US012795139B2

(12) United States Patent
Khazatskiy et al.

(10) Patent No.: US 12,795,139 B2
(45) Date of Patent: Nov. 10, 2026

(54) SYSTEMS AND METHODS FOR SCALING VIDEO STREAMS

(71) Applicant: KARL STORZ SE & Co. KG, Tuttlingen (DE)

(72) Inventors: Igor Khazatskiy, Tuttlingen (DE); Sriharsha Inapurapu, Tuttlingen (DE); Thomas Whitehurst, Tuttlingen (DE); Nischal Bomdika, Tuttlingen (DE); Michael Shust, Tuttlingen (DE)

(73) Assignee: KARL STORZ SE & Co. KG, Tuttlingen (DE)

( * ) Notice: Subject to any disclaimer, the term of this patent is extended or adjusted under 35 U.S.C. 154(b) by 0 days.

(21) Appl. No.: 19/277,574

(22) Filed: Jul. 23, 2025

(65) Prior Publication Data

US 2025/0350754 A1 Nov. 13, 2025

Related U.S. Application Data

(63) Continuation of application No. 17/892,246, filed on Aug. 22, 2022, now abandoned.

(51) Int. Cl.
*H04N 19/44* (2014.01)
*H04N 5/45* (2011.01)
*H04N 7/01* (2006.01)

(52) U.S. Cl.
CPC ............... *H04N 19/44* (2014.11); *H04N 5/45* (2013.01); *H04N 7/0122* (2013.01)

(58) Field of Classification Search
CPC ........ H04N 19/44; H04N 5/45; H04N 7/0122; H04N 21/4223; H04N 21/64322; H04N 21/234363; G16H 30/20; G16H 20/40
See application file for complete search history.

(56) References Cited

U.S. PATENT DOCUMENTS

| | | | |
|---|---|---|---|
| 9,462,308 | B2 | 10/2016 | LaBosco et al. |
| 2013/0222688 | A1 | 8/2013 | Tang et al. |
| 2021/0335483 | A1 | 10/2021 | Freeman et al. |
| 2023/0135759 | A1 | 5/2023 | Karl |
| 2024/0064320 | A1 | 2/2024 | Khazatskiy et al. |

FOREIGN PATENT DOCUMENTS

| | | |
|---|---|---|
| CN | 115348414 A | 11/2022 |

OTHER PUBLICATIONS

Office Action for U.S. Appl. No. 17/892,246, mailed Sep. 24, 2024.
Office Action for U.S. Appl. No. 17/892,246, mailed Jan. 8, 2025.
Notice of Allowance for U.S. Appl. No. 17/892,246, mailed Apr. 23, 2025.

*Primary Examiner* — James M Pontius
(74) *Attorney, Agent, or Firm* — Scott Weitzel; Jason Worgun; David Villalpando

(57) ABSTRACT

Methods and systems are provided for scaling video streams, and in particular video streams of medical data such as those from an endoscope. Video streams can be scaled to match the resolution requirements of a video display device. By performing the video scaling on a single computing chip, video scaling can be achieved while avoiding or mitigating the 8.5 Gbps bandwidth limitations of 10G networks. The use of the single computing chip can also reduce costs associated with using multiple computing chips. The result is a multi-view, cost-effective solution for displaying high-quality video streams while avoiding 10G Ethernet network bottlenecks.

20 Claims, 7 Drawing Sheets

SYSTEMS AND METHODS FOR SCALING VIDEO STREAMS

CROSS REFERENCE TO RELATED APPLICATIONS

This application is a Continuation of U.S. patent application Ser. No. 17/892,246, filed Aug. 22, 2022, the disclosure of which is incorporated herein by reference in its entirety.

BACKGROUND

The present disclosure is generally directed to video processing and, in particular, toward scaling video encoded in Software Defined Video over Ethernet (SDVoE) format.

10G networks are capable of transmitting data and other information at up to 10 gigabytes per second (Gbps), enabling quick transfer of large quantities of data. However, 10G networks are effectively limited to 8.5 Gbps bandwidth for uncompressed video. This results in slowed processing times and bandwidth bottlenecks when processing data streams near or at the 8.5 Gbps limit.

SUMMARY

Shortcomings of the above can be addressed with the systems and methods disclosed herein. Providing a processing chip capable of simultaneous data stream input and output in SDVoE format beneficially reduces costs associated with processing 10G data streams, improves power consumption, and reduces the number of cables and other components needed to process and transmit one or more 10G data streams through the systems, devices, and apparatuses discussed herein.

The processing chip may also include additional encoders and decoders disposed therein, such that a 10G data stream can be received and scaled by a single processing chip. The scaled 10G data stream can then be output by the single processing chip and transmitted to a display, where the 10G data stream can be decoded and rendered. The use of the single processing chip obviates the need for a chain of encoders and decoders connected to a 10G network. The use of the single chip also beneficially enables the scaling of video sources into any required resolution, providing a low-cost, multiview solution for processing and displaying 10G streams.

DETAILED DESCRIPTION

The exemplary systems and methods of this disclosure will be described in relation to video processing. However, to avoid unnecessarily obscuring the present disclosure, the description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

Figure 1:
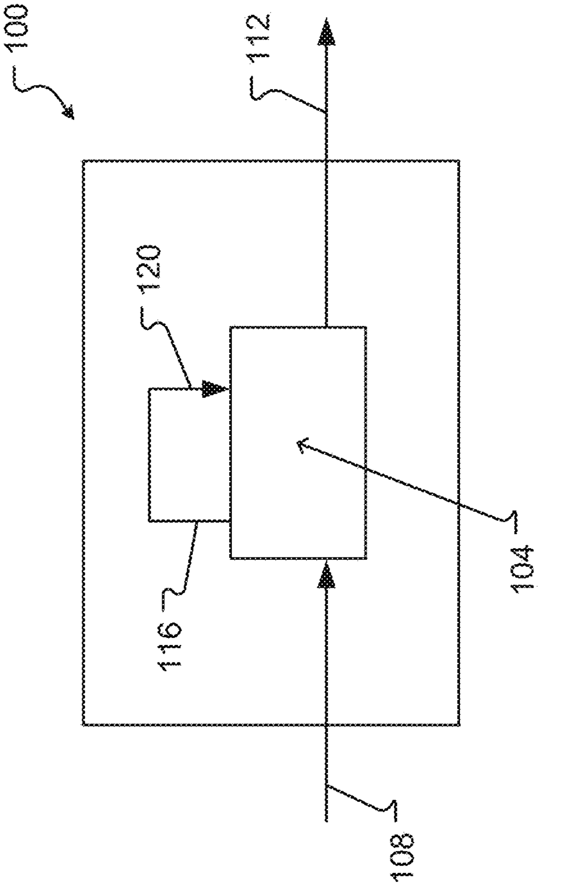
FIG. 1 shows a processing unit according to at least one exemplary embodiment.

Turning first to FIG. 1, aspects of a computing chip 100 are shown according to at least one exemplary embodiment. The computing chip 100 may be or comprise a processor, GPU(s) or other processing components capable of receiving, processing, and transmitting video data. The computing chip 100 includes an encoder/decoder 104. The encoder/decoder 104 may be or comprise one or more encoders (e.g., a device or component that generates, for example, 10G output streams based on HDMI input streams) and one or more decoders (e.g., a device or component that generates, for example, HDMI output streams based on 10G input streams), and may provide one or more functions for scaling video data streams or any resolution, format and/or bandwidth. For example, and as discussed in further detail below, the encoder/decoder 104 may be capable of receiving an HDMI input stream and outputting an intermediate 10G data stream, further processing the intermediate 10G stream using a 10G scaler, and outputting a 4K60 10G stream. In some embodiments, the encoder/decoder 104 may use one or more video compression techniques to encode and decode the data streams, such as H.264, VP8, RV40, DS10G, or the like. In one embodiment, the encoder/decoder 104 may use SDVoE codecs to encode and decode the data streams.

The computing chip 100 may receive an input data stream 108 and transmit an output data stream 112. In some embodiments, the input data stream 108 may be or comprise video streams with various bandwidths. For example, the input data stream 108 may be a 1080P60 data stream (e.g., a data stream that, when rendered to a display, has a 1920×1080 pixel resolution displayed at up to 60 frames per second), a 4K60 data stream (e.g., a data stream that, when rendered to a display, has a 3840×2160 pixel resolution, a 4096×2160 pixel resolution, or the like, capable of being displayed at up to 60 frames per second), and the like. The input data stream 108 may be a High-Definition Multimedia Interface (HDMI) data stream, which includes uncompressed data received from, for example, a video feed (e.g., an endoscope generating a video feed of a surgical site). The output data stream 112 may be or comprise video streams with various bandwidths based on, for example, the type of data stream input into the computing chip 100. For example, the output data stream 112 may be a data stream with up to 1080P60 video quality when a 1080P60 HDMI stream is input into the computing chip 100, while the output data stream 112 may be up to a 1440P60 data stream when a 4K60 HDMI stream is input into the computing chip 100. In some embodiments, the input data stream 108 may be generated during a surgery or surgical procedure, or may be otherwise generated within the context of a surgical environment. For example, the input data stream 108 may be generated by an endoscope used to survey, scan, or otherwise observe a surgical site and/or an anatomical element of a patient.

In some embodiments, the computing chip 100 may receive a data stream that requires scaling. For example, the input data stream 108 may be or comprise a 4K60 data stream which, when output from the computing chip 100, would use the entirety of the 8.5 Gbps bandwidth. This may be undesirable, since the output stream can be used as a source for video compositing or for general operating room routing of the data, but not both. To address this issue, the computing chip 100 may use a 10G scaler disposed in the computing chip 100. The 10G scale may include an intermediate decoder and encoder that scales the input data stream 108 to produce another output stream that can be used for video compositing, which may beneficially reduce the size of the encoding and decoding apparatus, improve power consumption, reduce costs, and reduce the number of cables and other components needed to connect the 10G data stream to the one or more systems discussed herein. In some embodiments, the first encoder of the computing chip 100 may output the intermediate output stream 116, which may be a 10G data stream based on the 4K60 input data stream that can be used for operating room displays. The intermediate output stream 116 may then also be passed through another decoder. The decoder may produce the intermediate input stream 120, which may be a non-10G data stream (e.g., an HDMI data stream) that is then passed as an input into an additional encoder. The additional encoder may then encode the data stream to produce the output data stream 112 that can be used for video compositing.

In some embodiments, the computing chip 100 may be used within the context of a surgical environment, such as when a surgeon is performing a surgery or surgical procedure. For example, the computing chip 100 may be used to encode and decode 10G data streams associated with a raw video feed captured by an endoscope or other surgical instrument during the course of the surgery or surgical procedure. It is to be understood that the present disclosure is no way limited to a surgery or surgical procedure, and use of the computing chip 100 within the context of any medical field or medical environment is possible.

Figure 2A:
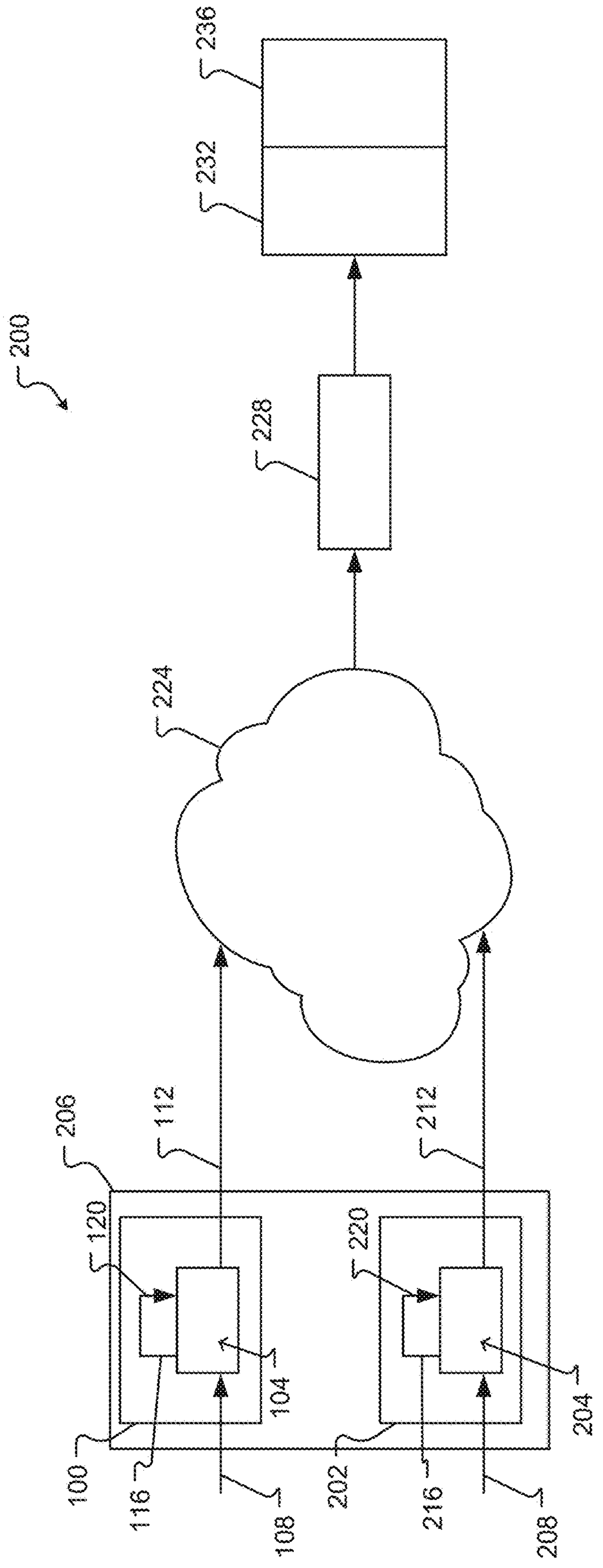
FIG. 2A shows aspects of a system according to at least one exemplary embodiment.
Figure 2B:
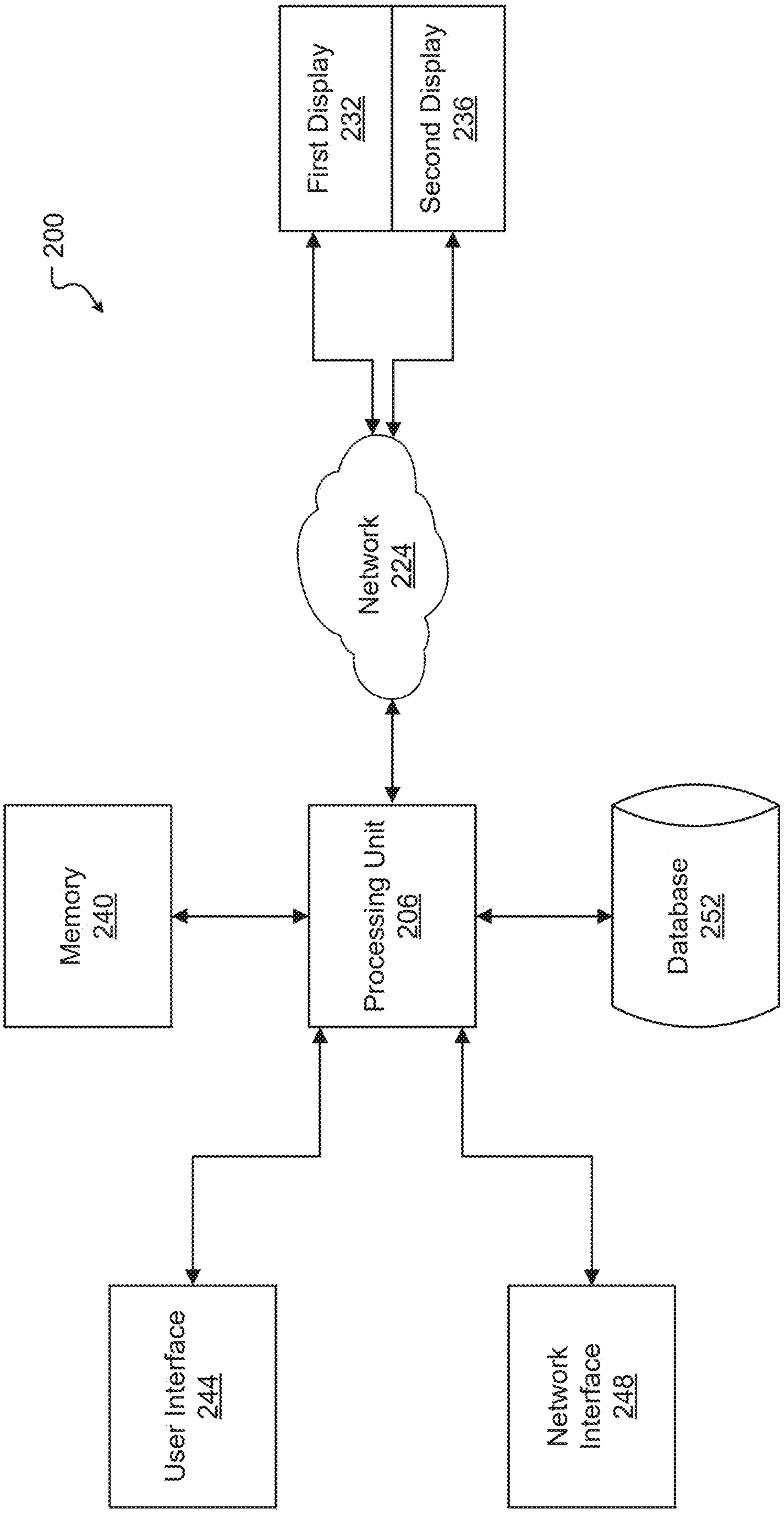
FIG. 2B shows additional aspects of the system according to at least one exemplary embodiment.

FIGS. 2A-2B show aspects of a system 200 according to at least one exemplary embodiment. The system 200 includes a processing unit 206, a 10G network 224, a decoder 228, a first display 232, a second display 236, a memory 240, a user interface 244, a network interface 248, and a database 252. In some embodiments, the system 200 may include additional or alternative components than those shown in FIGS. 2A-2B. For example, in some optional embodiments the system 200 may omit the second display 236 and have only first display 232 as a display.

The processing unit 206 may provide processing functionality and may correspond to one or many computer processing devices. For instance, the processing unit 206 may be provided as a Field Programmable Gate Array (FPGA), an Application-Specific Integrated Circuit (ASIC), any other type of Integrated Circuit (IC) chip, a collection of IC chips, a microcontroller, a collection of microcontrollers, a GPU(s), or the like. As a more specific example, the processing unit 206 may be or comprise a BlueRiver® Semtech AVP2000T AV processor chip, or any similar chip capable of transmitting SDVoE formatted video streams or other similar data streams. The use of the AVP2000T AV processor chip may be particularly advantageous since the AVP2000T AV processor chip includes both the SDVoE format, while also enabling both simultaneous input and output of the 10G data streams. Information about the AVP2000T AV processor is accessible via the Internet address "https://www.semtech.com/products/professional-av/blueriver/avp2000t", and is incorporated herein in entirety by reference. As another example, the processing unit 206 may be provided as a microprocessor, Central Processing Unit (CPU), GPU, or plurality of microprocessors that are configured to execute the instructions sets and/or data stored in memory 240. The processing unit 206 enables various functions of the system 200 upon executing the instructions and/or data stored in the memory 240.

The processing unit 206 includes the computing chip 100 and, optionally, a computing chip 202. The computing chip 202 includes an encoder/decoder 204, an input data stream 208, an output data stream 212, an intermediate output stream 216, and an intermediate input stream 220, which may respectively be similar to or the same as the encoder/decoder 104, the input data stream 108, the output data stream 112, the intermediate output stream 116, and the intermediate input stream 120 of the computing chip 100.

Notwithstanding the foregoing, the processing unit 206 may have one or more additionally computing chips than those shown. The additional computing chip 202 may permit the system 200 to process additional data streams, or otherwise provide bandwidth for processing multiple streams (e.g., multiple, optionally parallel, 4K60 data streams). In one embodiment, the computing chip 100 and the computing chip 202 may be or comprise AVP2000T AV processor chips capable of performing various encoding, scaling, and/or decoding functions to process video streams, and more specifically video streams encoded in SDVoE format. In this embodiment, the AVP2000T AV processor chip may operate as a video processor (e.g., a 10G scalar) to produce additional processed streams that can be used for video composition, thus providing the functionality of both an encoder and a decoder. The use of the AVP2000T AV processor chips may beneficially reduce costs in comparison to, for example, using a chain of encoders and decoders that are individually connected to the 10G network.

The 10G network 224 may be a collection of transmitters, receivers, and/or cables (electrical and/or optical) that transfer data streams from the processing unit 206 to the decoder 228 and, by extension, to the first display 232 and the second display 236. The 10G network 224 may be or comprise a collection of fiber optic cables (e.g., single-mode fiber, multi-mode fiber, etc.), 10G base cables (e.g., 10GBase-SR cable, 10GBase-LR cable, laser optimized cable, etc.), Category 6 ("Cat6") cabling, and the like (e.g., 8K Optic Fiber HDMI 2.1 cables) capable of transferring the output data streams into the decoder 228. In some embodiments, the 10G network 224 may include one or more wireless or Wi-Fi capabilities (e.g., ability to communicate with other networks wirelessly, ability to transfer data to or from the decoder 228 to other locations or virtual spaces, etc.). The 10G network 224 may provide 10 Gpbs transfer speed capabilities and/or may otherwise have sufficient bandwidth to transfer 10G data streams.

The decoder 228 may be or comprise components (e.g., processors, logic gates, and the like) capable of converting 10G data streams into non-10G data streams, and may provide compositing functionality. For example, the decoder 228 may receive a 10G data stream from the 10G network 224, and the 10G data stream may be composited (e.g., scaling of data to ensure the output stream matches the pixel parameters of the first display 232 and/or the second display 236). In some embodiments, the decoder 228 may include artifact removal functionality. In some embodiments, the decoder 228 may decode the output data stream 112 and the output data stream 212 respectively generated by the computing chip 100 and/or the computing chip 202.

The first display 232 and the second display 236 may be or comprise a liquid crystal display (LCD), a light emitting diode (LED) display, a high definition (HD) display, a 4K display, or the like. The first display 232 and the second display 236 may be stand-alone displays or a display integrated as part of another device, such as a smart phone, a laptop, a tablet, a headset or head-worn device, and/or the like. In one embodiment, the first display 232 and the second display 236 may be monitors or other viewing equipment disposed within an operating room, such that video feed captured from a surgery or surgical procedure can be rendered to the first display 232 and/or the second display 236 for a physician to view.

The memory 240 may be or comprise a computer readable medium including instructions that are executable by the processing unit 206. The memory 240 may include any type of computer memory device and may be volatile or non-volatile in nature. In some embodiments, the memory 240 may include a plurality of different memory devices. Non-limiting examples of memory 240 include Random Access Memory (RAM), Read Only Memory (ROM), flash memory, Electronically-Erasable Programmable ROM (EEPROM), Dynamic RAM (DRAM), etc. The memory 240 may include instructions that enable the processing unit 206 to control the various elements of the system 200 and to store data, for example, into the database 252 and retrieve information from the database 252. The memory 240 may be local (e.g., integrated with) the processing unit 206 and/or separate from processing unit 206.

The database 252 includes the same or similar structure as the memory 240 described above. In at least one exemplary embodiment, the database 252 is included in a remote server and stores video data captured during a surgery or surgical procedure (e.g., a camera on an endoscope capturing a live feed during an endoscopy).

The user interface 244 includes hardware and/or software that enables user input to the system 200 and/or any one or more components thereof. The user interface 244 may include a keyboard, a mouse, a touch-sensitive pad, touch-sensitive buttons, mechanical buttons, switches, and/or other control elements for providing user input to the system 200 to enable user control over certain functions the system 200 (e.g., enabling/permitting compositing of video data streams, rendering processed video to the first display 232 and/or the second display 236, etc.). Simply as an illustrative example, the first display 232 may have input buttons and switches, and, additionally, a keyboard or mouse may be connected directly to the processing unit 206. All of these together constitute the user interface 244.

The network interface 248 may enable one or more components of the system 200 to communicate wired and/or wirelessly with one another or with components outside the system 200. These communication interfaces that permit the components of the system 200 to communicate using the network interface 248 include wired and/or wireless communication interfaces for exchanging data and control signals between one another. Examples of wired communication interfaces/connections include Ethernet connections, HDMI connections, connections that adhere to PCI/PCIe standards and SATA standards, and/or the like. Examples of wireless interfaces/connections include Wi-Fi connections, LTE connections, Bluetooth® connections, NFC connections, and/or the like. In some embodiments, the network interface 248 may enable the 10G network 224 to communicate with the processing unit 206, the decoder 228, the first display 232, and the second display 236. For instance, the network interface 248 may include one or more network switches that enable data to pass from the processing unit 206 into the 10G network 224, and vice versa. As another example, the network 224 may communicate with the first display 232 and/or the second display 236 through the network interface 248, enabling the user to interact with the 10G network 224 (e.g., using the user interface 244 coupled with the first display 232 and/or the second display 236).

Figure 3A:
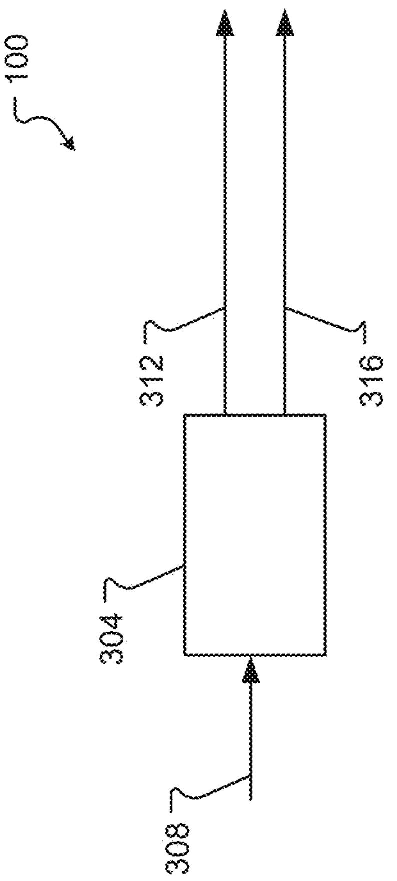
FIG. 3A shows a configuration for processing a 1080P input stream according to at least one exemplary embodiment.
Figure 3B:
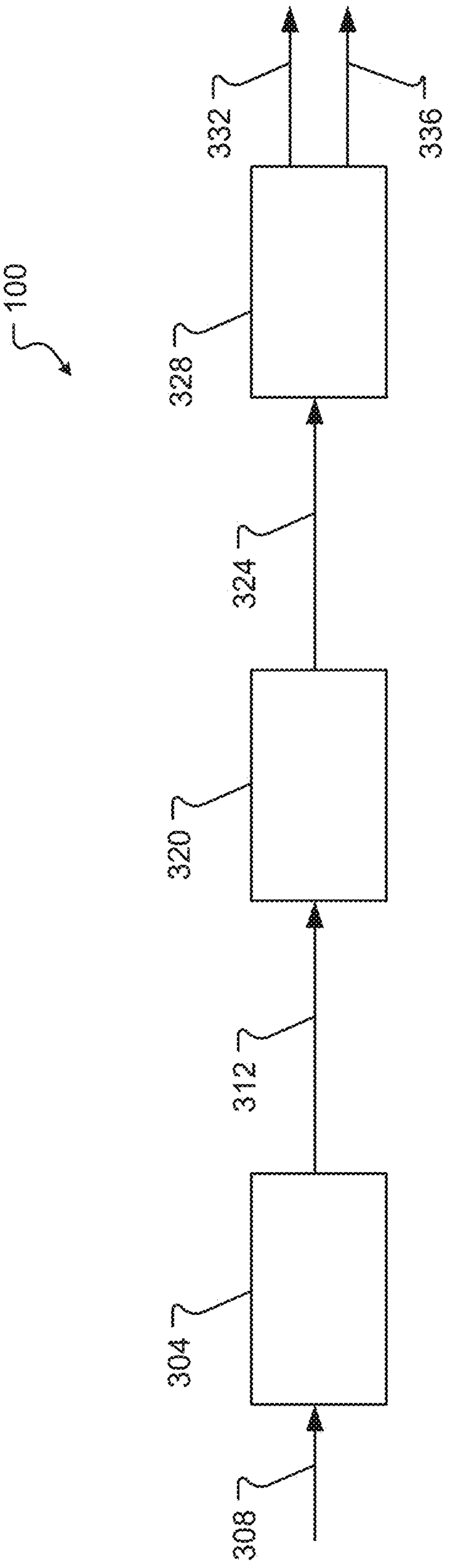
FIG. 3B shows a configuration for processing a 4K60 input stream according to at least one exemplary embodiment.

FIGS. 3A-3B illustrate various processing capabilities of the processing unit 206 or components thereof according to at least one exemplary embodiment of the present disclosure. More specifically, the computing chips 100, 202 of the processing unit 206 may include a plurality of encoders and decoders that process data streams and perform data compositing thereon. As shown in FIG. 3A, the encoder 304 (which may be similar to or the same as the encoder functionality of the encoder/decoder 104 or the encoder/decoder 204) may receive an input stream 308. The input stream 308 may be similar to or the same as the input data stream 108 or the input data stream 208. For example, the input stream 308 may be an HDMI input stream of varying bandwidth up to 1080P60. The input data stream 208 may be derived from a video stream of, for example, a surgical site. For instance, an endoscope or other surgical imaging device may capture a video feed of a surgical site, such as a target anatomical object during the course of a surgery or surgical procedure.

The input stream 308 may be input into the encoder 304, which may create two output streams: a first output stream 312 and a second output stream 316. The first output stream 312 may be a 10G data stream with up to 1080P60 of bandwidth. The first output stream 312 may be eventually routed to the first display 232 and/or the second display 236 through the use of the 10G network 224 and the decoder 228. The second output stream 316 may be a data stream used for compositing. For example, the second output stream 316 may be scaled to the size required by the final composited output. The final composited output may be a Picture in Picture, a side by side, a quad composition, or the like. More generally, the final composited output may be or comprise different combinations of rectangular video areas disposed proximate one another, overlapping each other, or the like. The first output stream 312 and the second output stream 316 may be controlled by a processor or other controller. For instance, an API server or other processing unit (e.g., the processing unit 206) may enable or disable the output of the first output stream 312 and/or the second output stream 316 from the encoder 304.

Turning to FIG. 3B, aspects of the processing unit 206 are shown according to at least one exemplary embodiment. Similar to FIG. 3A, the encoder 304 may receive the input stream 308, which may up to a 4K60 HDMI input stream. Since the input stream 308 may reach 4K60, the resulting first output stream 312 may be compressed and use all of the available 10G bandwidth. The first output stream 312 may be a 10G data stream that is routed to an operating room or other location. However, the first output stream 312 may not be available for compositing. As a result, the first output stream 312 may be the only stream flowing out of the encoder 304.

Additionally, the processing unit 206 may still be capable of generating multiple streams with a 10G scalar by passing the first output stream 312 directly into a decoder 320. The decoder 320 may convert the 4K60 10G data stream into an HDMI non-10G data stream, such as a 1080P60 data stream. This data stream may be output as an intermediate stream 324 that is immediately passed into another encoder 328, which performs a similar function to the encoder 304. That is, the encoder 328 converts the intermediate stream 324 into a third output stream 332 and a fourth output stream 336.

The third output stream 332 may be similar to or the same as the first output stream 312, while the fourth output stream 336 may be similar to or the same as the second output stream 316. The fourth output stream 336 may be a scaled down 10G data stream, such as a 1440P60 data stream (e.g., a 1920×1440 pixel resolution displayed at 60 frames per second when rendered to a display). The fourth output stream 336 may then be used as a compositing source that corresponds to the first output stream 312. As a result, the use of the combination of the decoder 320 and the encoder 328 as a 10G scalar permits the processing unit 206 to convert a 4K60 data stream into two separate 10G data streams while avoiding the 8.5 Gbps bottleneck.

When there are multiple 4K60 data streams, the processing unit 206 may make use of a plurality of 10G scalars, with each 10G scalar being used to process an individual 4K60 data stream. For example, if there are two 4K60 data streams, the processing unit 206 would utilize two 10G scalars. In another example, if there are four 4K60 data streams, the processing unit 206 would utilize four 10G scalars. In some embodiments, the number of streams available for compositing may provide a limit on the number 10G scalars. For example, if a compositor can only use up to four streams at a time, then only four 10G scalars would be required to process the 4K60 streams.

Figure 4:
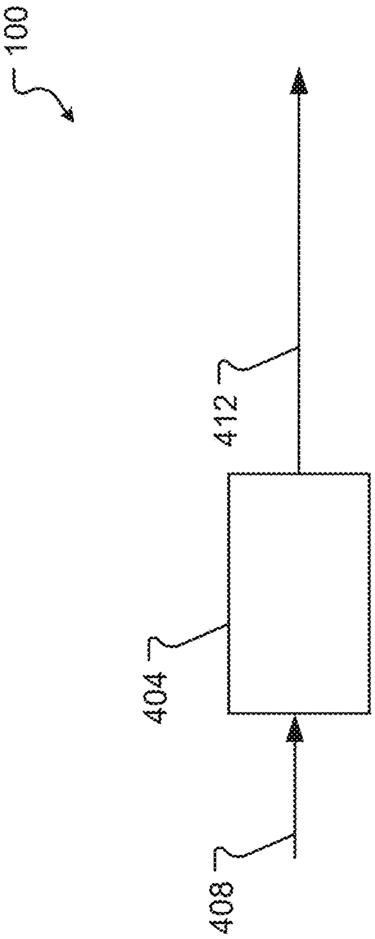
FIG. 4 shows a decoder according to at least one exemplary embodiment.

Turning to FIG. 4, a decoder 404 is shown according to at least one exemplary embodiment. In some embodiments, the decoder 404 may be similar to or the same as the decoder 228 or the decoder 320, and may be disposed within the computing chip 100. The decoder 404 may receive one or more scaled 10G streams such as 1080P60 streams, 1080P30 streams, 720P60 streams as a first input stream 408 and generate a first output stream 412. The first output stream 412 may be or comprise a non-10G data stream, such as an HDMI 2.0 output that can be displayed on, for example, the first display 232 and/or the second display 236. The parameters of the output stream may vary based on the output window pattern of the display on which the video is to be displayed. In one example, the decoder 404 may be configured for Picture-in-Picture (PiP) displays. The PiP displays may have output resolutions of 3840×2160, with a large window picture resolution of 3840×2160 and a PiP window picture resolution of 1280×720. Alternatively, the output resolution may be 1920×1080, with a large window picture resolution of 1920×1080 and a Pip window picture resolution of 640×360. As a result, the first input stream 408 may include two separate streams: a first stream with up to a 1080P60 bandwidth and a second stream with up to a 720P60 bandwidth. The decoder 404 may then decode the streams into the non-10G stream and route the first output stream 412 to the first display 232 and/or the second display 236 to be displayed. The overall composited image may be scaled up to 4K60 on the monitor of the first display 232 or the second display 236.

In another example, the decoder 404 may be configured for a Picture-and-Picture (PaP) display. For instance, when the output resolution is 3840×2160, the left picture and the right picture may both have 1920×1080 resolution. Similarly, when the output resolution is 1920×1080, the left picture and the right picture may both have a 960×540 resolution. In cases where PaP is desired, the first input stream 408 may include two 1080P60 data streams that are input into the decoder 404. In other embodiments, the first input stream 408 may include data streams that permit a 2560×1440P window and a 1280×720P window to be rendered on the same display. The decoder 404 may receive the two 1080P60 data streams and output the first output stream 412, which may be an HDMI 2.0 output that is routed to the first display 232 and/or the second display 236.

In yet another example, the decoder 404 may be configured to enable a Quad View (e.g., four 1080P windows) display. When the output resolution is 3840×2160, each of the four windows may have a 1920×1080 resolution, and when the output resolution is 1920×1080, each of the four windows may have a 960×450 resolution. In such embodiments where a quad-view format is used, there may be four different input streams that are sent into the decoder 404, with each input stream being up to 1080P30. Since four data streams at 1080P60 would exceed the bandwidth of the 10G network, the input streams may be scaled down to 1080P30 by an encoder, such as the encoder 304 of the computing chip 100, before being input into the decoder 404. Once the four data streams have been routed into the decoder 404, the decoder 404 may convert the streams into non-10G streams, such as an HDMI 2.0 output that can be displayed on the first display 232 and/or the second display 236. Since the window display may be Quad View, all four data streams may be displayed on the same display.

For illustrative purposes only, the following is an example of a method for processing data generated in the context of a surgical environment. Input data may be created during the course of a surgery or surgical procedure in the surgical environment. The input data may be generated by, for example, an endoscope or other surgical instrument that captures raw video of a surgical site and/or of an anatomical element during the surgery or surgical procedure. An example of the raw video (e.g., an uncompressed video feed) may be video associated with a surgical site. The raw video may be a 10G video stream that is passed to a computer chip or other processor, which may include a 10G encoder and decoder. In some cases, the computer chip or other processor may be or comprise an AVP2000T AV processor chip capable of providing both encoding and decoding in the SDVoE format. The raw video may be processed by the encoder of the processor chip to produce an intermediate, encoded data stream. The encoded data stream can then be passed through the decoder of the processor chip to produce a decoded stream. The decoded stream can then again be passed through an encoder to generate an output data stream. The output data stream can then be sent over a network and subsequently decoded to produce a video stream. The video stream can be rendered to one or more displays, such as displays within an operating room. The rendering to the displays may be performed to enable one or more users in the surgical environment (e.g., a surgeon, a member of surgical staff, etc.) to view the video feed generated by the endoscope or other surgical instrument, to provide a visual depiction of the surgical site, or for any other reason. By providing additional encoding and decoding on the processor chip (which may be or comprise an AVP2000T AV processor chip), processor resources associated with processing the 10G data stream can be beneficially conserved, and overall cost associated with transmitting, processing, and rendering 10G data streams can be beneficially reduced.

Figure 5:
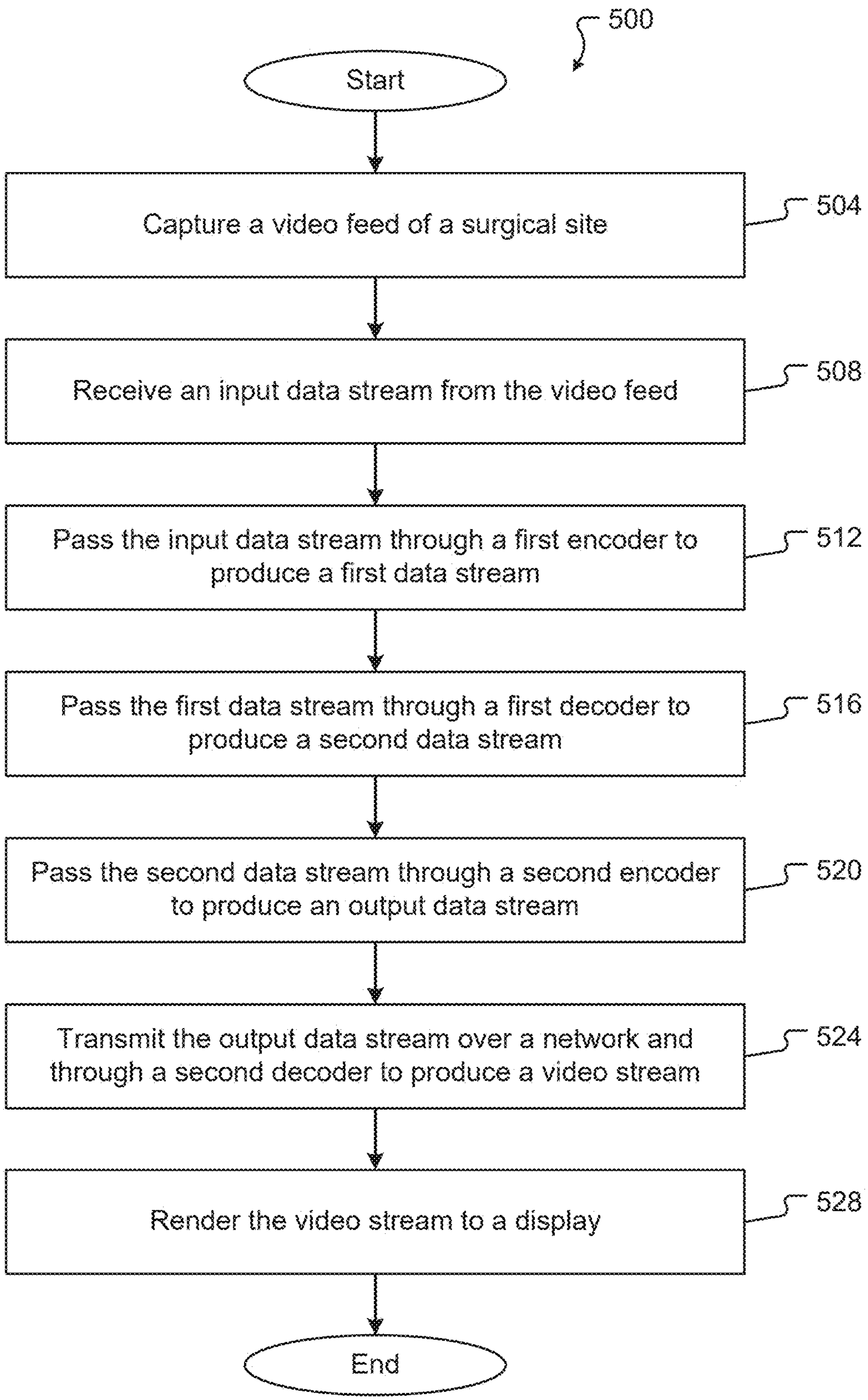
FIG. 5 shows a method according to at least one exemplary embodiment.

FIG. 5 shows a method 500 according to at least one exemplary embodiment of the present disclosure. The method 500 may be used, for example, to transmit a video feed from a surgical site to a display.

The method 500 comprises capturing a video feed of a surgical site (step 504). The video feed may be generated from a medical instrument or device that views the surgical site during a surgery or surgical task. For example, an endoscope may capture a live feed of a portion of a patient's esophagus during a scoping of the patient's upper esophagus. The captured feed may be routed through the endoscope to one or more components of the system 200, such as the processing unit 206, the memory 240, and/or the database 252. In some embodiments, more than one medical instrument and/or more than one video feed may be captured simultaneously.

The method 500 also comprises receiving an input data stream from the video feed (step 508). The input data stream may be similar to or the same as the input data stream 108, the input data stream 208, and/or the input stream 308. The bandwidth of the input data stream may vary based on, for example, the quality or type of device capturing the video feed. Non-limiting examples of the input data stream include a 1080P60 data stream, a 4K60 data stream, a 720P60 data stream, and the like. Additionally, the input data stream may be a non-10G, uncompressed data stream with a bandwidth of less than 8.5 Gbps, such that the input data stream can be converted to a data stream capable of traversing through a 10G network.

The method 500 also comprises passing the input data stream through a first encoder to produce a first data stream (step 512). The first encoder may be similar to or the same as the encoder 304. In other words, the first encoder may receive the input data stream and create two output data streams therefrom. The first data stream may be similar to or the same as the first output stream 312, while the second output stream from the encoder may be similar to or the same as the second output stream 316. The first data stream may be a routable 10G stream (e.g., an up to 1080P60 data stream) that can be routed to a display, while the second data stream may be a 10G stream used for compositing. That is, the second data stream may be scaled to the size required by the final composited output.

The method 500 also comprises passing the first data stream through a first decoder to produce a second data stream (step 516). In some embodiments, the input data stream may be a 4K60 data stream that is compressed and, when output by the first encoder, would use all available bandwidth on the 10G network. As a result, when the 4K60 data stream is passed through the first encoder, only the first data stream (e.g., the data stream routable through the 10G network) is generated, and the second data stream used for compositing is not generated. To generate the analogous second stream, the first stream may be routed through the 10G network, and also passed into the first decoder. The first decoder may be similar to or the same as the decoder 228 or the decoder 320, and may receive the 10G data stream from the first encoder and produce the second data stream. The second data stream may be a non-10G data stream, such as an HDMI 2.0 data stream.

The method 500 also comprises passing the second data stream through a second encoder to produce an output data stream (step 520). The second data stream may pass into the second encoder, which may be similar to or the same as the encoder 328. The second encoder may then generate two output data streams. The first output data stream may be a scaled stream that can be used for video compositing. The second output stream may be omitted or not used in rendering the data stream to a display.

The method 500 also comprises transmitting the output data stream over a network and through a second decoder to produce a video stream (step 524). The output data stream may be transmitted over a 10G network, such as the 10G network 224. The second decoder may be similar to or the same as the decoder 404, and may receive the first output data stream together with the first data stream output from the first encoder, and may use the data streams to produce the output data stream. The output data stream may be or comprise a scaled video capable of being rendered to a display. In some embodiments, the second decoder may receive up to four different data streams and perform video compositing to scale, adjust, transform, or otherwise change the input streams to match the requirements of the display. For instance, in a PiP or PaP display, the second encoder may receive two data streams from two different computing chips (e.g., from the computing chip 100 and the computing chip 202) that make up the left and right sources of pictures to be displayed on the screen. The second decoder may then adjust the streams and generate the output stream. The output stream may be a non-10G data stream, such as an HDMI 2.0 output that can be up to 4K60 in bandwidth. In another example, such as when the display is a Quad View display, the second decoder may receive four scaled streams at up to 1080P30 from one or more computing chips, and generate an HDMI 2.0 output stream at up to 4K60 bandwidth.

The method 500 also comprises rendering the video feed to a display (step 528). The output stream from the second decoder may then be rendered to the display. The display may be similar to or the same as the first display 232 and/or the second display 236. In some embodiments, the steps 504 through 524 may be continuously repeated as the video feed of the surgical site is updated. For instance, the physician may move the device generating the video, and the method 500 may proceed such that the video stream is processed and rendered to the display in real time or near real-time (e.g., one or two frame delay).

Any of the steps, functions, and operations discussed herein can be performed continuously and automatically.

While the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined into one or more devices, such as a server, communication device, or collocated on a particular node of a distributed network, such as an analog and/or digital telecommunications network, a packet-switched network, or a circuit-switched network. It will be appreciated from the preceding description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

While the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

Example aspects of the present disclosure include:

A system to process data generated in a medical environment according to at least one embodiment of the present disclosure comprises: a processor configured to receive an input stream, scale the input stream, and generate an output stream; and a network configured to transmit the output stream to a decoder.

Any of the aspects herein, wherein the scaling the input stream comprises: passing the input stream through a first encoder to produce a first stream; passing the first stream through a first decoder to produce a second stream; and passing the second stream through a second encoder to produce the output stream.

Any of the aspects herein, wherein the input stream is a non-10G data stream, and wherein the output stream is a 10G data stream.

Any of the aspects herein, wherein the decoder receives the output stream and transmits a data stream to a display.

Any of the aspects herein, wherein the data stream is rendered on the display in a Picture-in-Picture (PiP) format, a Picture-and-Picture (PaP) format, or a Quad-View format.

Any of the aspects herein, wherein the input stream is a 1080P60 stream or a 4K60 stream, and wherein the input stream is generated by a surgical instrument.

Any of the aspects herein, wherein the input stream is an uncompressed video feed of a surgical site.

A system to process data generated in a medical environment according to at least one embodiment of the present disclosure comprises: a processor; and a memory storing data thereon that, when processed by the processor, cause the processor to: receive an input stream; scale the input stream; and generate an output stream.

Any of the aspects herein, wherein the data further cause the processor to: forward the output stream to a network.

Any of the aspects herein, wherein the data further cause the processor to: pass the input stream into a first encoder to produce a first stream; pass the first stream into a first decoder to produce a second stream; and pass the second stream into a second encoder to produce the output stream.

Any of the aspects herein, wherein the input stream and the second stream are non-10G data streams, and wherein the first stream and the output stream are 10G data streams.

Any of the aspects herein, wherein a network sends the output stream to a decoder, and wherein the decoder decodes the output stream into a video stream.

Any of the aspects herein, wherein the video stream is routed to a display, and wherein the video stream is displayed on the display in a Picture-in-Picture (PiP) format, a Picture-and-Picture (PaP) format, or a Quad-View format.

Any of the aspects herein, wherein the input stream includes video data associated with an anatomical element, and wherein the input stream is generated by an endoscope.

Any of the aspects herein, wherein the input stream is an uncompressed video feed of a surgical site.

A method to process data generated in a medical environment, the method comprising: receiving a non-10G input data stream; scaling the non-10G input data stream by passing the non-10G input data stream through a first encoder and through a first decoder; generating a 10G output stream; and transmitting the 10G output stream to a second decoder.

Any of the aspects herein, wherein the scaling further comprises: passing the non-10G input data stream through the first encoder to produce a first 10G data stream; passing the first 10G data stream through the first decoder to produce a first non-10G data stream; and passing the first non-10G data stream through a second encoder to produce the 10G output stream.

Any of the aspects herein, wherein the 10G output stream is passed to the second decoder through a 10G network.

Any of the aspects herein, wherein the second decoder decodes the 10G output stream into a non-10G video stream.

Any of the aspects herein, wherein the non-10G video stream is routed to a display, and wherein the non-10G video stream is displayed in a Picture-in-Picture (PiP) format, a Picture-and-Picture (PaP) format, or a Quad-View format.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

What is claimed is:

1. A system to process data generated in a medical environment, the system comprising:

a processor configured to receive an input stream, scale the input stream, and generate a plurality of output streams; and a network configured to transmit the output streams to respective decoders, wherein:

a resolution of the output stream is matched to a resolution of a corresponding display device, a first of the plurality of output streams is routed to one or more of a first and a second display, a second of the plurality of output streams is used for compositing, and parameters of the output streams are adjusted based on an output window pattern of the display on which the video is to be displayed.

2. The system of claim 1, wherein the scaling the input stream comprises:

passing the input stream through a first encoder to produce a first stream;

passing the first stream through a first decoder to produce a second stream; and passing the second stream through a second encoder to produce the output streams.

3. The system of claim 2, wherein the input stream is a non-10G data stream, and wherein at least one of the output streams is a 10G data stream in a Software Defined Video over Ethernet (SDVoE) format.

4. The system of claim 3, wherein the decoder receives the output stream and transmits a data stream to a display.

5. The system of claim 4, wherein the data stream is rendered on the display in a Picture-in-Picture (PiP) format, a Picture-and-Picture (PaP) format, or a Quad-View format.

6. The system of claim 1, wherein the input stream is a 1080P60 stream or a 4K60 stream, and wherein the input stream is generated by a surgical instrument.

7. The system of claim 1, wherein the input stream is an uncompressed video feed of a surgical site.

8. A system to process data generated in a medical environment, the system comprising:

a processor; and a memory storing data thereon that, when processed by the processor, cause the processor to:

receive an input stream;

scale the input stream; and generate a plurality of output streams wherein a resolution of the output streams is matched to a resolution of a corresponding display device, a first of the plurality of output streams is routed to one or more of a first and a second display, a second of the plurality of output streams is used for compositing, and parameters of the output streams are adjusted based on an output window pattern of the display on which the video is to be displayed.

9. The system of claim 8, wherein the data further cause the processor to:

forward the output streams to a network and at least one output stream is in a Software Defined Video over Ethernet (SDVoE) format.

10. The system of claim 8, wherein the data further cause the processor to:

pass the input stream into a first encoder to produce a first stream;

pass the first stream into a first decoder to produce a second stream; and pass the second stream into a second encoder to produce the output stream.

11. The system of claim 10, wherein the input stream and the second stream are non-10G data streams, and wherein the first stream and the output stream are 10G data streams.

12. The system of claim 8, wherein a network sends the output stream to a decoder, and wherein the decoder decodes the output stream into a video stream.

13. The system of claim 12, wherein the video stream is routed to a display, and wherein the video stream is displayed on the display in a Picture-in-Picture (PiP) format, a Picture-and-Picture (PaP) format, or a Quad-View format.

14. The system of claim 8, wherein the input stream includes video data associated with an anatomical element, and wherein the input stream is generated by an endoscope.

15. The system of claim 8, wherein the input stream is an uncompressed video feed of a surgical site.

16. A method to process data generated in a medical environment, the method comprising:

receiving a non-10G input data stream;

scaling the non-10G input data stream by passing the non-10G input data stream through a first encoder and through a first decoder;

generating a 10G output stream; and transmitting the 10G output stream to a second decoder, wherein a resolution of the output stream is matched to a resolution of at least one display device and parameters of the output stream are adjusted based on an output window pattern of a display on which the video is to be displayed.

17. The method of claim 16, wherein the scaling further comprises:

passing the non-10G input data stream through the first encoder to produce a first 10G data stream;

passing the first 10G data stream through the first decoder to produce a first non-10G data stream; and passing the first non-10G data stream through a second encoder to produce the 10G output stream.

18. The method of claim 17, wherein the 10G output stream is passed to the second decoder through a 10G network.

19. The method of claim 18, wherein the second decoder decodes the 10G output stream into a non-10G video stream.

20. The method of claim 19, wherein the non-10G video stream is routed to a display, and wherein the non-10G video stream is displayed in a Picture-in-Picture (PiP) format, a Picture-and-Picture (PaP) format, or a Quad-View format.

* * * * *